United States Patent [19]

Manor et al.

[11] Patent Number: 5,251,818
[45] Date of Patent: Oct. 12, 1993

[54] SPRAYING EQUIPMENT FOR PLANTS GROWN IN ROWS

[75] Inventors: Gedalyahu Manor, Haifa; Amos Geva, Kiryat Tivon, both of Israel

[73] Assignee: Technion Research & Development Foundation, Ltd., Haifa, Israel

[21] Appl. No.: 902,593

[22] Filed: Jun. 22, 1992

[51] Int. Cl.⁵ .............................................. A01C 23/00
[52] U.S. Cl. ........................................ 239/77; 239/146; 239/172; 47/1.7
[58] Field of Search .................... 239/77, 146, 172; 47/1.7

[56] References Cited

U.S. PATENT DOCUMENTS

| | | | |
|---|---|---|---|
| 2,977,715 | 4/1961 | Lindsay | 239/77 |
| 5,002,227 | 3/1991 | Ehrenberg | 47/1.7 X |
| 5,028,002 | 7/1991 | Whitford | 239/77 X |
| 5,040,329 | 8/1991 | Michaloski | 47/1.7 X |

*Primary Examiner*—Andres Kashnikow
*Assistant Examiner*—Lesley D. Morris
*Attorney, Agent, or Firm*—Bacon & Thomas

[57] ABSTRACT

Spraying equipment for plants growing in parallel rows comprises a main horizontal air duct and several secondary ducts extending therefrom in downward direction between the rows of plants. Each duct is provided with air outlets directed towards the plants, which are alternatey opened and closed by valves so as to eject the air in pulses. One spray nozzle each is positioned in the center of each air outlet serving to eject into the pulsating air stream a jet of spraying fluid which is thereby carried onto the plants covering these from top to bottom. The equipment is attached to the front or rear of a tractor which carries a supply of spraying fluid and a pump serving to supply the material to each nozzle through piping. A blower is positioned in the main duct supplying air under pressure to the secondary ducts and to the air outlets.

19 Claims, 10 Drawing Sheets

SPRAYING EQUIPMENT FOR PLANTS GROWN IN ROWS

BACKGROUND OF THE INVENTION

The invention relates to the spraying of plants and trees growing in parallel rows, in order to control insect pests and plant diseases. It relates particularly to the spraying of insecticides and fungicides over the entire height of these plants with a view to keeping them healthy from top to bottom. It relates moreover to the distribution of the necessary chemicals with the aid of pulsating air streams.

Spraying of insecticides and fungicides is nowadays mostly done from the air, or by means of stationary or movable sprayers, both methods causing the upper portions of the plants to be covered only, while most of the lower portions are not treated.

Spraying is either carried out by power sprayers, or by blower sprayers, both kinds being in about equal use today. Most power sprayers are of the hydraulic type in which spray pressure is built up by direct action of a pump on the liquid spray material. The pressure thus developed forces the liquid through nozzles which break it into spray of the desired droplet size and disperse it in the desired spray pattern. The pump and the nozzles are so designed that sufficient energy is imparted to the spray droplets to carry them from the nozzles to the surfaces to be treated.

Blower sprayers employ a blast of air to carry the chemical to the foliage to be treated. The typical concentrate sprayer of the blower type utilizes a low-pressure, low-volume pump serving to force the spray material to a fan where it is discharged into an air stream in small droplets by a number of nozzles. The air stream assists in breaking up the liquid into small particles, acts as a diluent to prevent the drops from coalescing and serves as the vehicle to carry the fine droplets to the plant surface. These blower sprayers are generally used in orchards for the purpose of spraying rows of trees from a relatively wide distance.

Distribution of liquid or dry chemicals by means of airplanes is costly, but does not require special tracks as required for travelling spraying equipment. On the other hand, distribution is not uniform due to changing wind direction and force, and the lower plant portions are not covered. Owing to the unequal distribution it usually becomes necessary to spray a larger volume of chemicals than with the other methods, in order to cover the plants with the required minimum.

Movable spraying equipment generally consists of a tractor-drawn or tractor-mounted transverse boom which carries a main pipe to which a plurality of spray nozzles or sprinklers are attached. The tractor moves at a velocity suitable for equal and sufficient spraying of chemicals on the plants over which the boom travels.

With plants growing in parallel, distanced rows it is possible to reach the lower branches and leaves by means of another known equipment: a horizontal boom and/or a main distribution pipe attached to a tractor, is provided with downwardly extending branches, each with a number of spray nozzles inserted on opposite sides. The branches are equidistantly spaced coextensive with the spacing of the planted rows, whereby every branch travels along the center line between the rows for the sake of equal liquid distribution. The spray nozzles are fed the chemical by means of a pump mounted on the equipment, usually driven from the tractor engine through a power-take-off.

It has also been proposed to distribute the chemicals by air streams expelled from pipes reaching downwardly between the rows of plants and provided with nozzles placed into the air jets or into the air openings in these pipes. Such implements have been described and claimed in U.S. Pat. No. 2,977,715 (Lindsay), in F 1,232,915, (Raynal) and in U.S. Pat. No. 3,943,688 (Billings).

Although the use of these chemical sprayers is preferable to spraying by aircraft, it has been shown that the spray created by the air streams does not reach the lower parts of the plants where the leaves are more exposed to attack by vermins and insects and, owing to the absence of sun radiation, are more liable to suffer from these attacks.

It is, therefore, the main object of the present invention to provide equipment for blower spraying of spaced rows of plants over their entire height, and especially the leaves in their lower portions close to the soil.

It is a further object not to spray both sides of each plant simultaneously, but one after the other by short bursts of air and chemicals which should stir the leaves and thus serve to distribute the chemicals from top to bottom of each plant.

It is still another object to spray fruit trees growing in rows by spraying equipment arranged close to the contours of these trees, again in bursts which follow each other at short intervals.

And it is a final object to provide equipment of simple design and at low costs.

SUMMARY OF THE INVENTION

According to a major aspect of the invention the present spraying equipment is to be mounted on, or to be attached to, an agricultural tractor and to be moved across a field in the direction of, and between the spaced-apart, parallel rows of plants and trees to be sprayed. It is designed to spray fungicides or insecticides onto plants growing in rows by means of pulsating air streams in at least two successive blasts serving to shake the plant and its leaves with a view to covering the leaves and stalks on all sides, and especially the underside of the leaves from top to bottom of the plant. The equipment comprises at least two air ducts each containing several air outlets mounted in a row each serving to emit a pulsating air stream, and spray nozzles, one attached to each air outlet serving to spray drops of liquid spray material into the air stream emitted by the respective nozzle. The at least two air ducts are mounted on the equipment one behind the other in the direction of travel, to effect spraying of each plant by successive air streams designed to shake the leaves of the plant and thus to effect covering the entire leaf area with the respective spray material. Each air duct is supplied fresh air from a source of pressurized air, preferably by blower means mounted on a main duct from which the air ducts are extending in a direction parallel to the plant surface to be covered. Liquid spray material is delivered to the spray nozzles in front of each air outlet by means of a main pipe connected to a source of a pressurized liquid and provided with suitably extending pipe branches. The spray is taken up by the air streams which split it up into still smaller particles or droplets and carry it onto the leaves and stalks of the plants from top to bottom.

A preferred embodiment of the equipment used for spraying row crops comprises a horizontal main duct and several branch ducts extending in downward direction from the main duct, spaced in accordance with the distance of the rows of plants, the embodiment being characterized by that every second branch duct is angularly disposed in forward direction to the direction of the adjoining branch ducts. An axial or centrifugal blower is mounted in the center of the main duct and delivers air under pressure to every duct branch and every air outlet.

As an alternative the main duct is of relative large width and the branch ducts extend therefrom in vertical downward direction in parallel and staggered alignment.

Figure 1:
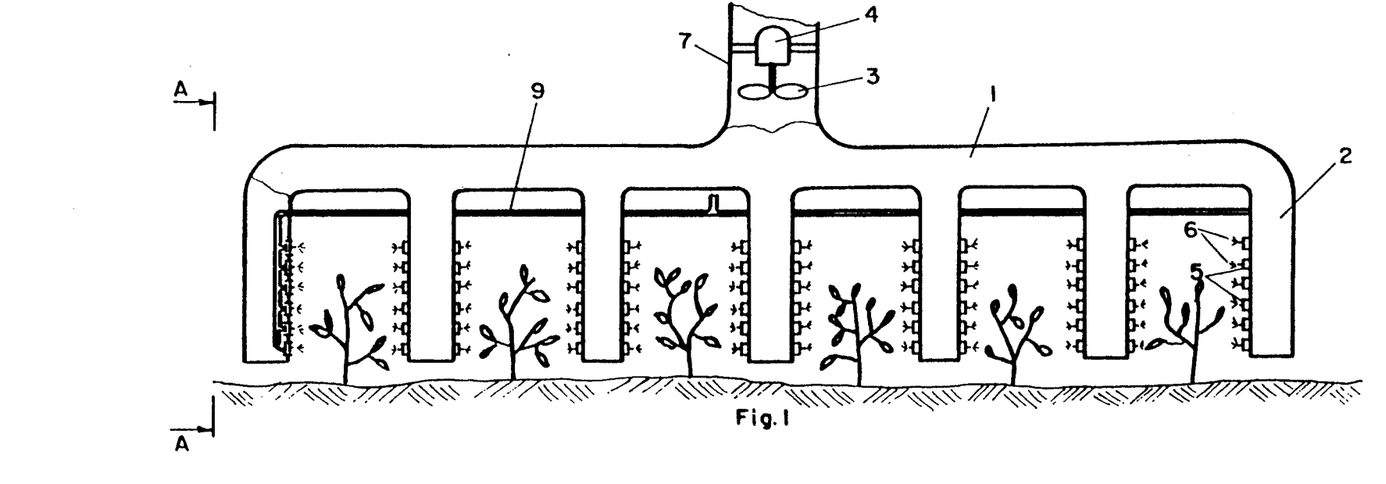
Figure 2:
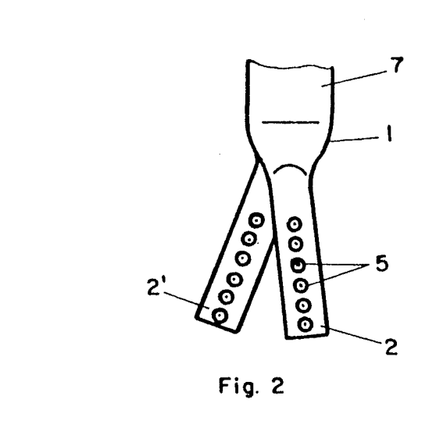
Figure 3:
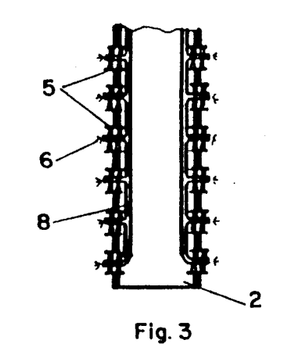

The pulsation of the air streams is created by different means, a preferred means comprising two axial propellers rotatingly and concentrically mounted in each cylindrical air outlet, the two propellers being distinguished from each other by opposite angles of attack of the vanes of the two propellers. The two propellers are either rotated by the air stream through the outlet in opposite sense of rotation or they are forcefully rotated by electrical, hydraulic or pneumatic means, again in opposite sense of rotation. A strong air stream is ejected through the two propellers whenever the gaps between the vanes coincide, and only a weak stream emerges whenever a vane of one propeller covers the gap between the vanes of the other. The two propellers should be provided with a different number of vanes, say 3 and 4, in case they are rotated by motor means in opposite sense of rotation, in order to create the desired pulses; on the other hand, they may have an equal number provided they rotate in opposite sense of direction at different rotational speeds, which can be achieved by giving them different angles of attack. Another means of effecting pulsating air streams through air outlets provided in a cylindrical duct branch consists of a perforated hollow cylinder rotated inside the duct, close to the duct wall. Air under pressure is conveyed into the rotating cylinder and is ejected through the perforations and the air outlets in the duct wall whenever the two coincide. The perforations are arranged in such a manner that adjoining outlets eject the air streams at staggered time intervals, thereby causing the plant to wave and vibrate under the impact of different air streams in different places. The cylinder is either rotated by an electric or pneumatic motor, or its top is rigidly connected to an axial impeller which is rotated by the air stream entering the cylinder from a main duct.

An embodiment of the equipment used for spraying fruit trees comprises two sets of several parallel and spaced-apart branch ducts positioned parallel to the tree contour and provided with air and spray nozzles which are provided with one of the aforementioned means for creating pulsating air streams out of the outlets as well as spray nozzles for injecting spray material into each air stream. As in the other embodiment, air under pressure is provided by one or more blowers mounted on the tractor or other vehicle carrying the equipment.

In order to provide thorough mixing of the liquid in the air stream a preferred embodiment of the equipment comprises a tube which serves to convey the spray material to the spray nozzle in the center of the air outlet, and which extends concentrically through the axle on which the two propellers are mounted.

Alternatively, a tube which serves as axle for carrying the propellers may serve simultaneously as carrier for the liquid. A spray nozzle is mounted at the end of the tube in the center of the air stream, thus ensuring perfect intermixing of air and liquid drops.

The ducts are advantageously made from thin metal or plastic sheeting, plastics being preferred due to its resistance to the sprayed chemicals.

SHORT DESCRIPTION OF THE DRAWINGS

FIG. 1 is part front view, part section of a spraying equipment for low plants growing in parallel rows provided with seven downwardly extending branches, FIG. 2 is a side view of the equipment shown in FIG. 1 along line A—A, with alternate branch ducts extending in downward direction in angular disposition, FIG. 2A is a similar side view of the equipment, but showing alternate branch ducts extending from a main duct in parallel and staggered alignment, FIG. 3 is an enlarged section of the left hand branch duct of FIG. 1, FIG. 4 is a cross section of an air outlet provided with a pulsating device in the form of two propellers adapted to be rotated by the air stream through the outlet, in opposite sense of direction, FIG. 5 is a plan view of the air outlet of FIG. 4 showing the air passages at a certain moment of rotation, FIG. 6 is a cross section of an air outlet and spray nozzle provided with a pulsating device in the form of two propellers driven by a motor means, FIG. 7 is a cross section of an air outlet similar to that illustrated in FIG. 6, showing a motor means driving the propellers by means of a belt drive, FIG. 8 is a longitudinal section of a branch duct provided with a pulsating device in the form of a perforated cylinder rotated by a propeller, FIG. 9 is a section of the device of FIG. 8 along line B—B, FIG. 10 is a section of a branch duct provided with the pulsating device of FIG. 8 driven and rotated by a motor means, FIG. 11 is a section of the device of FIG. 10 along line C—C, FIG. 12 is a schematic rear view of a spraying device for fruit trees encircling two rows of trees along the tree contours, and FIG. 13 is a top view of the device shown in FIG. 12.

DETAILED DESCRIPTION OF THE DRAWINGS

The spraying equipment illustrated in FIGS. 1 through 3 is adapted for attachment to a tractor or a similar agricultural vehicle and comprises a horizontal main air duct 1 and seven downwardly extending branch ducts 2 and 2', whereof the ducts 2 are substantially vertical or slightly rearwardly inclined, while the ducts 2' are forwardly inclined in respect to the ducts 2 in at least the FIG. 2 embodiment. The branch ducts are spaced in accordance with the spacing of the rows of plants to be sprayed, effecting one branch duct to be centrally positioned between two rows of plants. Air is supplied to the main duct by an axial blower 3 and motor 4 concentrically positioned in a vertical air shaft entering the main duct 1 from its top. Each branch duct 2 and 2' contains several air outlets 5 and centrally positioned spray nozzles 6 on opposite sides in longitudinal alignment. The spray nozzles are fed from a central supply tank by pumping means through a main pipe 9 and branch pipes 8 (visible in FIGS. 1 and 3).

An alternative arrangement of the branch ducts 2 and 2' is shown in FIG. 2A wherein the main duct is of larger width and the branch ducts extend therefrom in two rows in staggered alignment, all branch ducts being substantially vertical.

In both of the above-described embodiments, the main and branch ducts are formed with sufficiently large cross sections so as to reduce pressure losses and to ensure air streams of identical velocities being emitted through the several air outlets. The air outlets themselves preferably take the form of straight tubular sockets.

Figure 4:
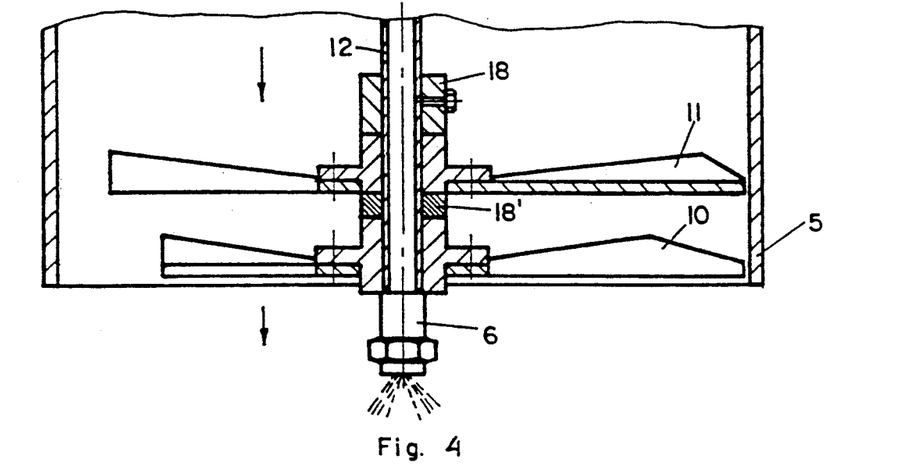
Figure 5:
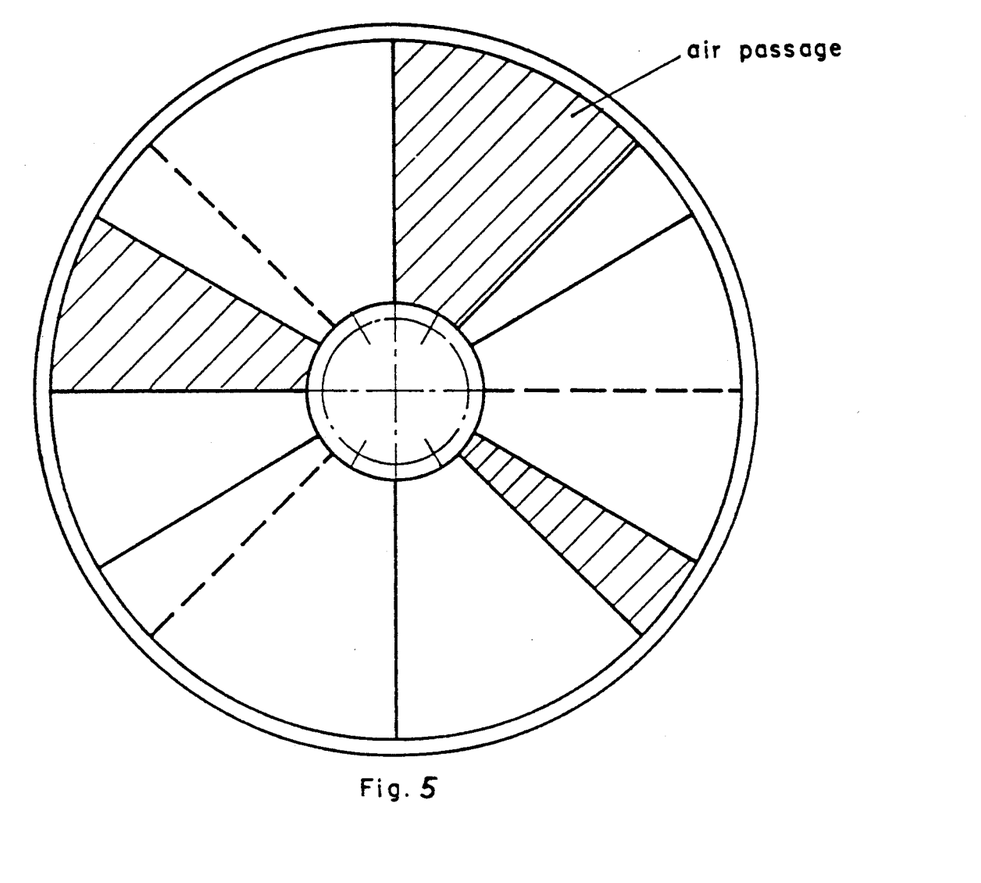

FIGS. 4 and 5 illustrate a first embodiment of the air pulsating device mounted in an air outlet concentrically therewith and comprising two propellers 10 and 11 mounted on a common axle 12 which also serves as conduit for the spray material and is provided with a spray nozzle 6 at its end. The propellers 10 and 11 are distinguished from each other by different numbers of vanes, as for instance three and four vanes, and by opposite angle of attack of the vanes, permitting opposite sense of rotation of the two propellers. In a known manner the propellers are held in position on the axle by a ring 18 at the inner end and the nozzle 6 at the outer end. The propellers are rotated in opposite directions by the air flowing from axial blower 3 and passing through the outlet, and it becomes evident that during opposite rotation of the propellers the air passages (shown by shading in FIG. 5) are wide when the gaps between the vanes coincide and are mostly obstructed, when the gaps of one propeller are covered by the vanes of the other, thereby causing varying air velocity through the air outlet and varying air blast on the plant, effecting shaking of the leaves and stalks.

Figure 6:
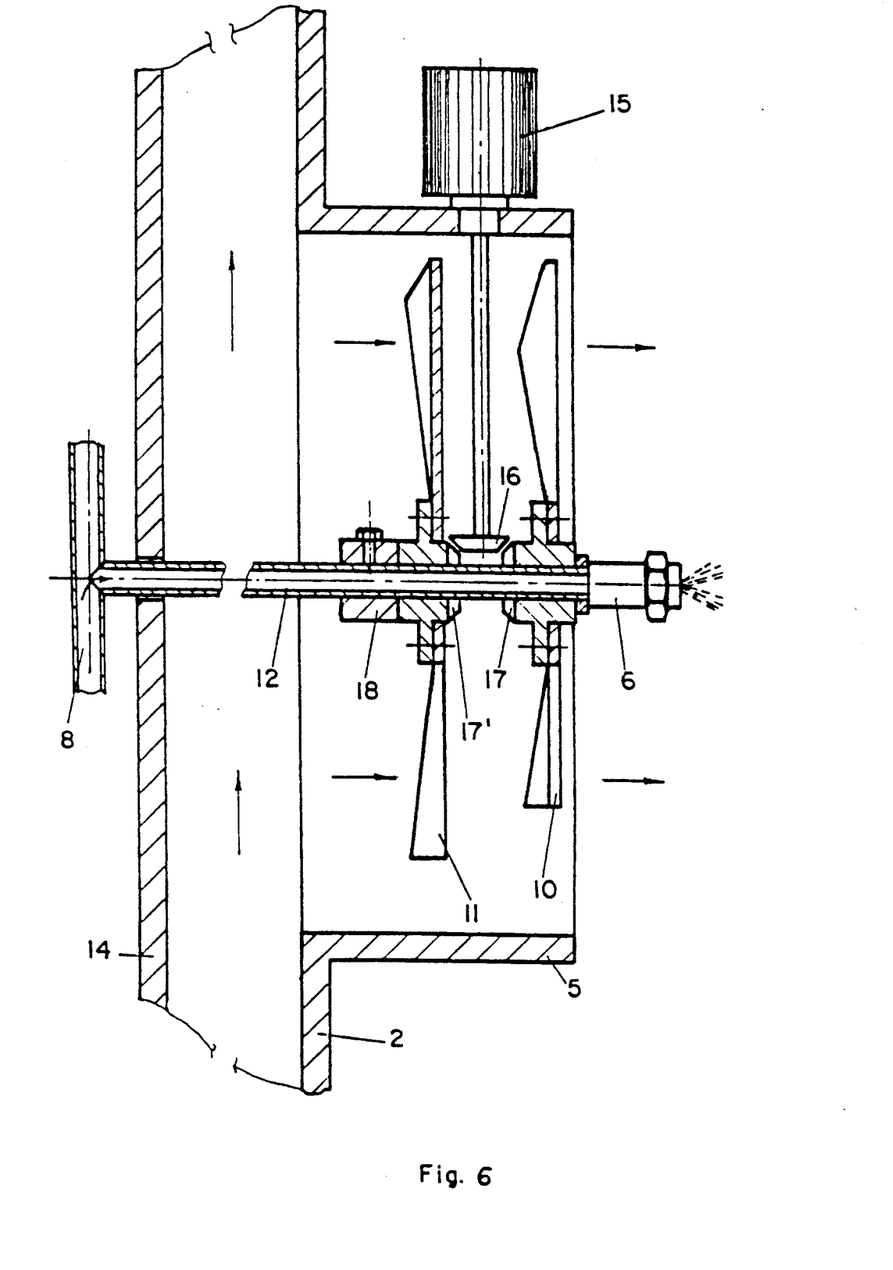

Another embodiment of the air pulsating device is shown in FIG. 6, wherein the two propellers—which may be provided with different or equal numbers of vanes—are rotated by apneumatic, hydraulic or electric motor 15. The opposite sense of rotation is obtained by bevel gears 17 and 17' integral with the hubs of the propellers and a gear 16 driven by the motor 15. The propellers are rotatably mounted on a shaft 12 which also serves as conduit for the chemical to be sprayed through the nozzle 6. The shaft is held in position by the rear wall 14 of the duct which also serves as support for the supply line 8. The action of the propellers in alternatingly creating larger and smaller air passages is the same as that described with regard to the embodiment shown in FIGS. 4 and 5.

Figure 7:
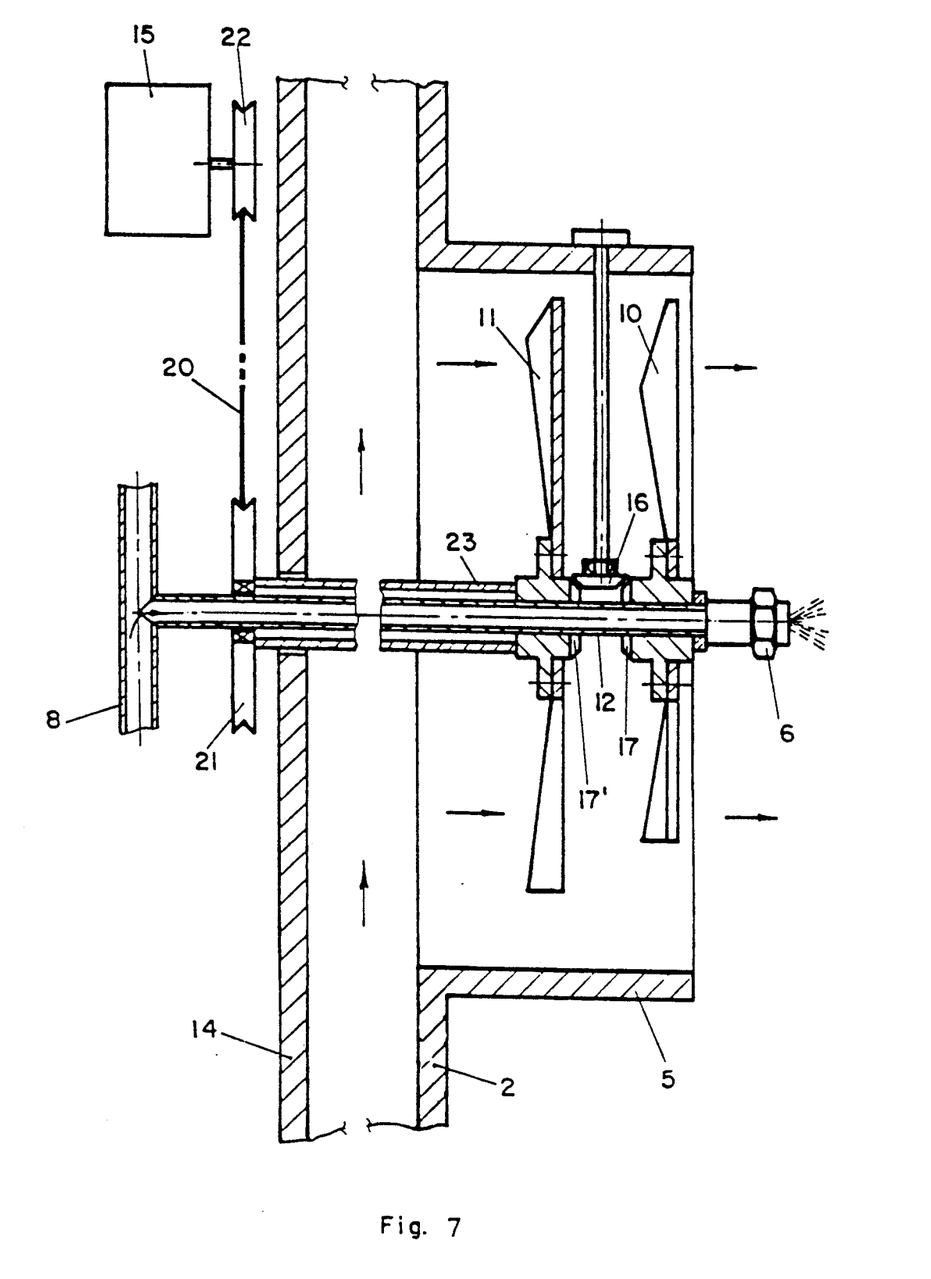

The air pulsating device shown in FIG. 7 is similar to that illustrated in FIG. 6 with the difference that a motor 15 drives the propellers by means of a belt drive 20, 21 and 22, a pulley 21 driving the propeller 11 by means of a tube 23. Reversal of the rotation is, as in the foregoing embodiment, obtained by a bevel gear arrangement 16, 17 and 17'.

Figure 8:
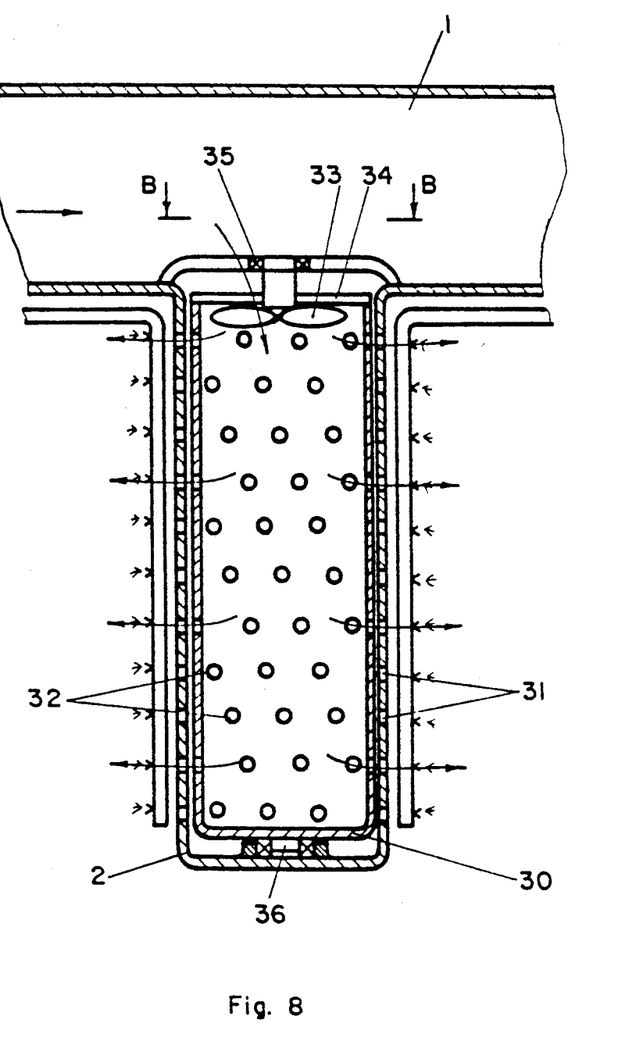
Figure 9:
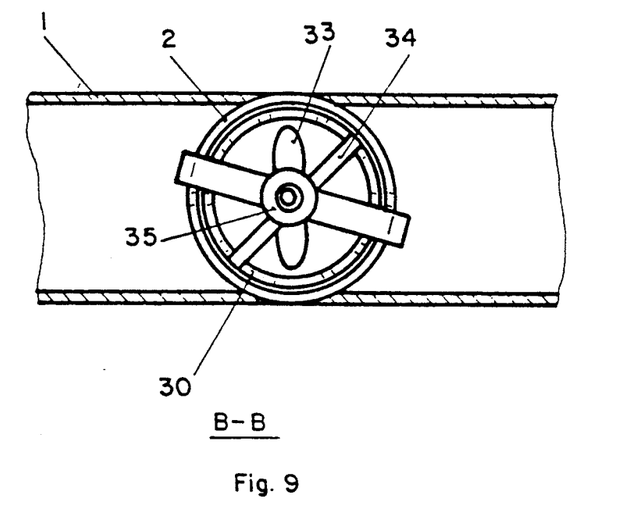

Another embodiment of the air pulsating device is illustrated in FIGS. 8 and 9, in the form of a perforated cylinder 30 rotating in the cylindrical branch duct 2 leaving a narrow gap between the two cylindrical walls. The branch duct 2 is perforated by two rows of air outlets 31, while the cylinder 30 is perforated by several staggered rows of perforations 32; rotation of the inner cylinder causes a given number of perforations 32 to coincide with air outlets 31, so that, as shown in the present embodiment, only one third of the air outlets emits air each time. The inner cylinder 30 is rotated by a propeller 33 which is driven by the air stream from the main air duct 1 and is connected to the cylinder by stays 34. The cylinder and the propeller are supported in bearings 35 on top and 36 at the bottom end. As can be seen from the drawings the spray nozzles 6 are arranged in front of the air outlets and are fed spray material through pipes 8 and 9 fastened to the outside of the air ducts 1 and 2. By suitably arranging the perforations in the rotating cylinder, more or less air outlets may emit air streams at the same time.

Figure 10:
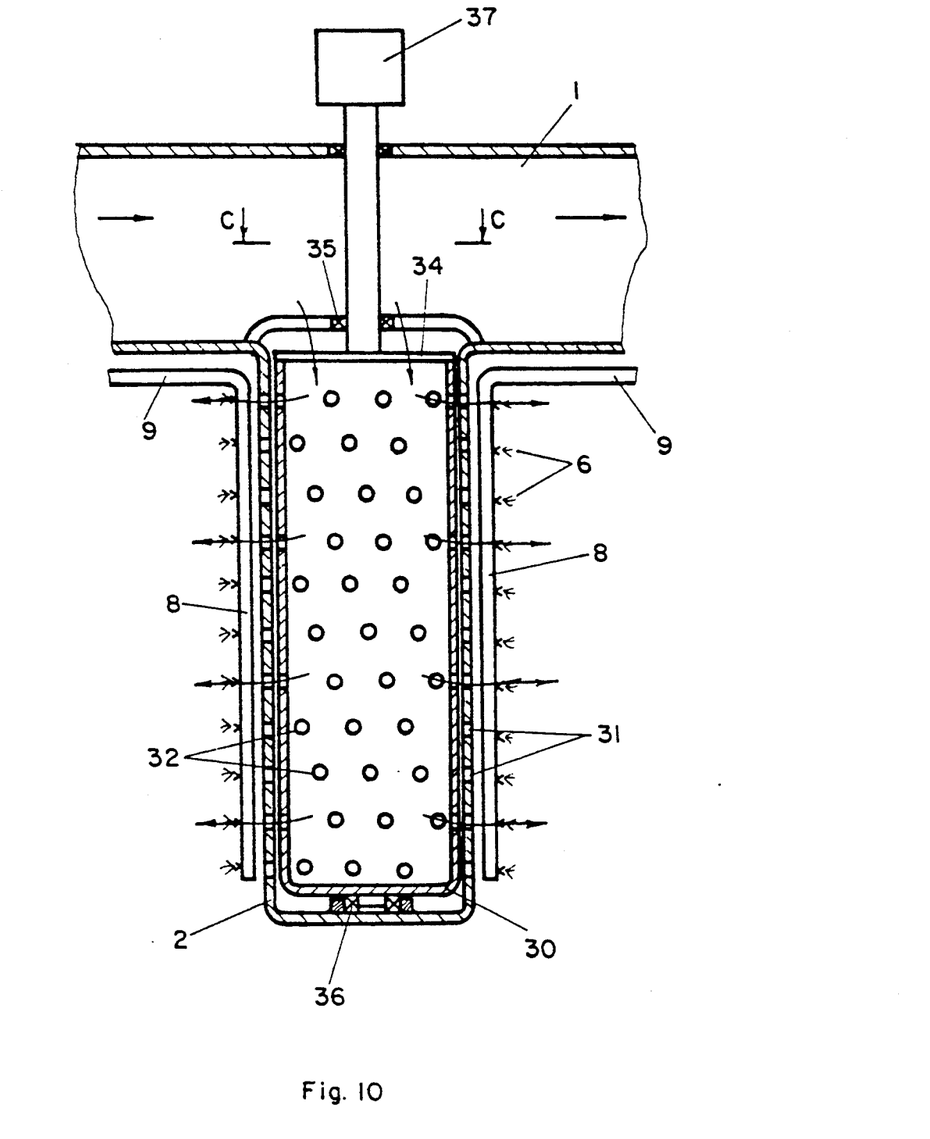
Figure 11:
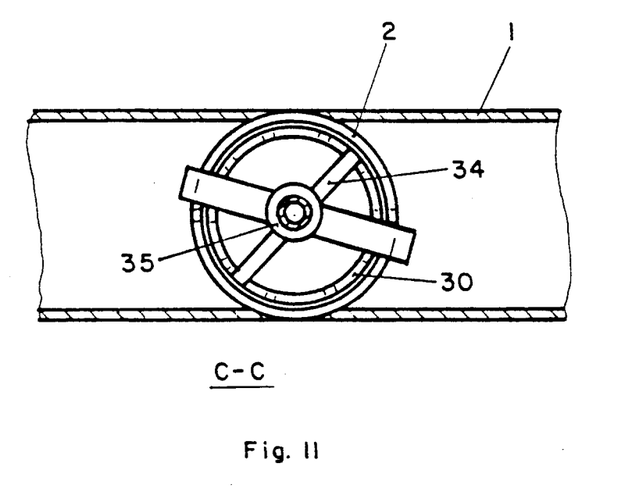

FIGS. 10 and 11 show an embodiment similar to that shown in FIGS. 8 and 9, wherein the perforated cylinder is shown to be driven by a motor 37 which is mounted on top of the main air duct 1 and supported by a tube 38 enclosing the shaft to the cylinder top (not visible). The remaining components of the device are identical with those of FIGS. 8 and 9 and are denoted by identical numerals.

Figure 12:
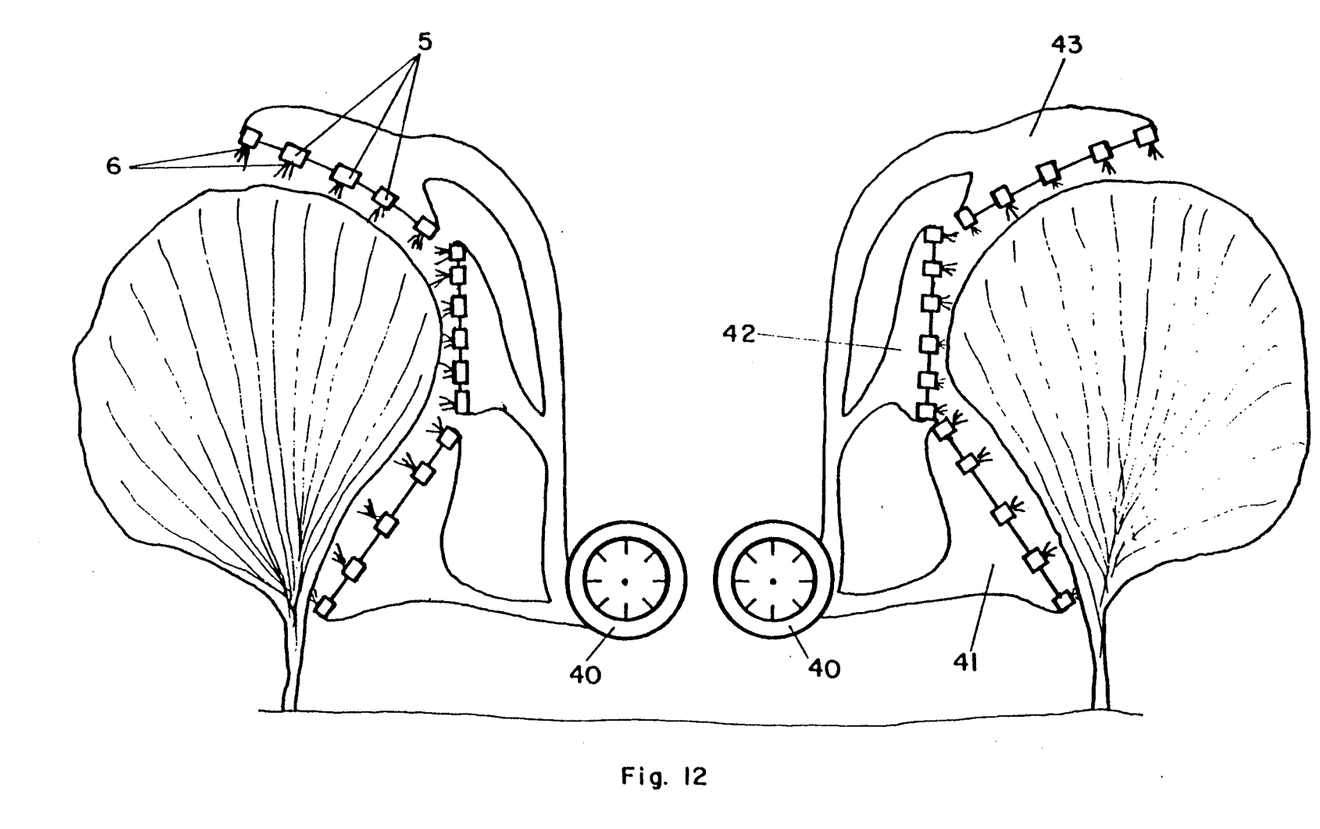
Figure 13:
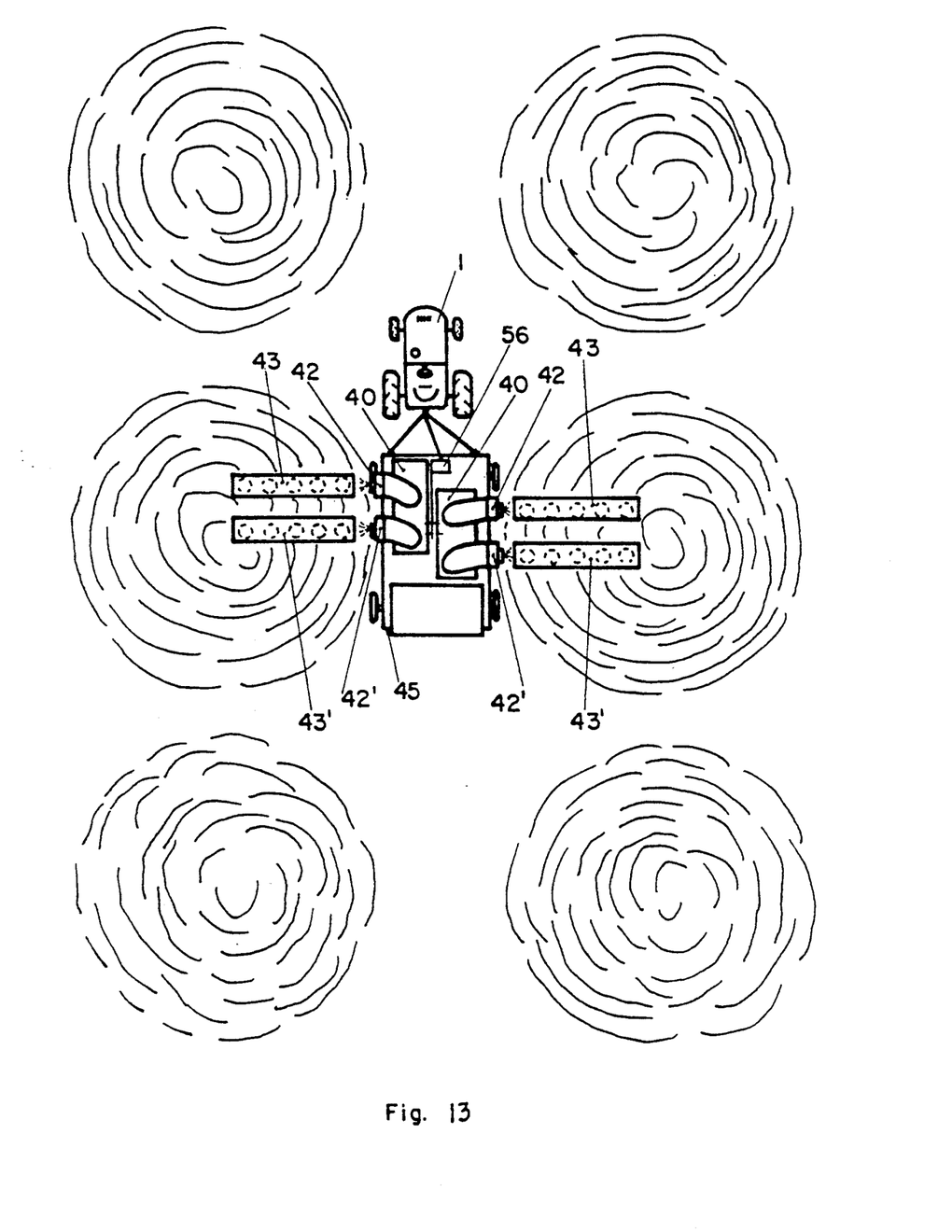

Equipment for spraying of fruit trees planted in rows is schematically shown in FIGS. 12 and 13. It is mounted on an agricultural vehicle and drawn by a tractor and comprises two similar parts for simultaneously spraying two parallel rows of trees, each part including a centrifugal blower 40 and three pairs of air-distributing ducts 41, 42, 43, and 41', 42', 43', so arranged that they hug the contours of the trees. The two pairs are spaced apart by a small distance with the object of applying spray in consecutive blasts. In a manner described in respect of the equipment for spraying low growing plants, each duct contains several air outlets 5 and spray nozzles 6 concentric with each of the air outlets; spray material is conveyed to the spray nozzles by piping not shown in the drawings, while each air outlet contains apparatus for effecting pulsating air streams of the kind illustrated in FIGS. 4 through 7, i.e. two concentrically mounted propellers driven by the air stream or by motor means.

It will be understood that the embodiments shown and described in the foregoing represent only examples of the spraying equipment characterized by two successive spraying operations and distribution of the spraying material by pulsating air streams, and that modifications and alterations may be carried out by a person skilled in the art, within the spirit of the present invention and the scope of the appended claims.

We claim:

1. An agricultural spraying equipment adapted to be attached to an agricultural traction vehicle and to be moved across a field in the direction of and between parallel rows of plants to be sprayed from top to bottom, the equipment comprising:

a source of pressurized air in the form of a blower, a main air duct supplied air from said source of pressurized air and attached to said vehicle in substantially horizontal alignment perpendicular to the direction of travel and at a height removed from the tops of the plants to be sprayed, several air duct branches extending downwardly from said main air duct in spaced relationship to the spacing of said rows of plants with a predetermined number of said air duct branches being forwardly disposed in the direction of travel, each said duct branch being provided on opposite sides with a plurality of spaced-apart air outlets directed towards the plants to be sprayed, each said air outlet being provided with means causing air to be ejected in alternating pulses in the direction of said rows of plants, spray nozzles, one each positioned in concentric alignment with each air outlet designed to spray spraying material into said air stream emitted by each said air outlet, means mounted on said tractor or vehicle for supplying liquid spraying material under pressure, and piping for conveying said spraying material from said supply of liquid to said spray nozzles.

2. The spraying equipment of claim 1, wherein said air duct branches extend from said main duct alternately in forwardly and rearwardly inclined directions.

3. The spraying equipment of claim 1, wherein said air duct branches extend downward from said main duct in parallel, staggered alignment.

4. The spraying equipment of claim 1, wherein said air duct and said air duct branches are of sufficiently large cross sections with the object of reducing pressure losses and to ensure air streams of identical velocity emitted by all said air outlets.

5. The spraying equipment of claim 1, wherein said air outlets are in the form of straight tubular sockets.

6. The spraying equipment of claim 5, wherein said means for creating pulsating air streams out of said air outlets is in the form of two propellers rotatingly and concentrically mounted in each air outlet in close proximity, and wherein the vanes of said two propellers have opposite angles of attack, causing said propellers to be rotated in opposite sense of rotation.

7. The spraying equipment of claim 6, wherein said propellers are freely movable on an axle concentric with said air outlet and are rotated by the air stream through said air outlet.

8. The spraying equipment of claim 6, wherein one of said two propellers is rotated by motor means and the other is rotated in opposite sense of rotation by bevel gears connecting said two propellers.

9. The spraying equipment of claim 6, wherein said two propellers are rotated by motor means and a bevel gear driving said propellers in opposite sense of rotation by means of one bevel gear each integral with one said propeller.

10. The spraying equipment of claim 8, wherein said motor means is a pneumatic motor.

11. The spraying equipment of claim 9, wherein said motor means is a pneumatic motor.

12. The spraying equipment of claim 8, wherein said motor means is an electric motor.

13. The spraying equipment of claim 9, wherein said motor means is an electric motor.

14. The spraying equipment of claim 8, wherein said motor means is a hydraulic motor.

15. The spraying equipment of claim 9, wherein said motor means is a hydraulic motor.

16. The spraying equipment of claim 1, wherein each said air duct branch is cylindrical in shape, and wherein a perforated hollow cylinder is rotatably mounted in said duct in close wall proximity, and wherein air is conveyed into said cylinder while the latter is rotated, effecting air to be alternately emitted through a number of air outlets in said air duct whenever the perforations in said rotating cylinder coincide with said air outlets.

17. The spraying equipment of claim 16, wherein said perforated hollow cylinder is rotated by means of a propeller mounted on its top and actuated by the air flow through said cylinder.

18. The spraying equipment of claim 16, wherein said perforated hollow cylinder is rotated by means of a motor mounted on top of said main air duct.

19. An agricultural spraying equipment adapted for attachment to an agricultural traction vehicle and to be moved along a row of trees to be sprayed, comprises:

blower means supplying air under pressure to said spraying equipment, equipment for supplying spraying material to said spraying equipment, two pairs of branch air ducts in parallel alignment in the direction of travel and communicating with said blower means by at least one main air duct, said branch air ducts being arranged parallel to the contours of said trees, each said branch air duct being provided with several cylindrical air outlets directed towards said trees, spray nozzles mounted concentrically with said air outlets and communicating with said supply of spraying material by means of piping, and a pair of propeller means adapted for opposite sense of rotation mounted in each cylindrical air outlet serving to effect a pulsating air stream out of each air outlet.

* * * * *